US012643486B2

(12) United States Patent
Hickman guevara et al.

(10) Patent No.: US 12,643,486 B2
(45) Date of Patent: Jun. 2, 2026

(54) ROTATABLE BICYCLE FORK MOUNT FOR A VEHICLE

(71) Applicant: Ford Global Technologies, LLC, Dearborn, MI (US)

(72) Inventors: Alfonso Hickman guevara, Tlalnepantla (MX); Cuauhtemoc Quiroz Garfias, Mexico City (MX); Jesus Mendoza, Alvaro Obregon (MX); Uriel Elam Loza Zuniga, Tultitlan (MX); Luis Jesus Chavela Guerra, Lomas del Salitre (MX)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 18/488,410

(22) Filed: Oct. 17, 2023

(65) Prior Publication Data

US 2025/0121777 A1 Apr. 17, 2025

(51) Int. Cl.
B60R 9/10 (2006.01)

(52) U.S. Cl.
CPC ..................................... B60R 9/10 (2013.01)

(58) Field of Classification Search
CPC ...................................................... B60R 9/10
USPC ......................................... 224/403–405, 924
See application file for complete search history.

(56) References Cited

U.S. PATENT DOCUMENTS

| | | | | | |
|---|---|---|---|---|---|
| 4,437,597 A | * | 3/1984 | Doyle | ....................... | B60R 9/10 |
| | | | | | 211/23 |
| 4,934,572 A | * | 6/1990 | Bowman | ................... | B60R 9/00 |
| | | | | | 224/570 |
| 5,362,173 A | * | 11/1994 | Ng | ........................... | B62H 3/00 |
| | | | | | 403/324 |
| 5,427,286 A | * | 6/1995 | Hagerty | .................... | B60R 9/00 |
| | | | | | 224/570 |
| 5,699,945 A | * | 12/1997 | Micklish | .................. | B60R 9/10 |
| | | | | | 224/924 |
| 6,123,498 A | * | 9/2000 | Surkin | ...................... | B60R 9/06 |
| | | | | | 224/924 |
| 6,398,091 B1 | * | 6/2002 | Munoz | ..................... | B60R 9/10 |
| | | | | | 224/403 |
| 6,834,786 B2 | * | 12/2004 | Hansen | ..................... | B60R 9/10 |
| | | | | | 211/20 |
| D689,012 S | * | 9/2013 | Kuschmeader | .............. | D12/408 |
| 9,821,721 B2 | * | 11/2017 | Casagrande | ............. | B60R 9/08 |
| 12,017,618 B2 | * | 6/2024 | Lindholm | ............... | B60R 9/048 |
| 2004/0084491 A1 | | 5/2004 | Gibson | | |

(Continued)

FOREIGN PATENT DOCUMENTS

KR 101786731 B1 10/2017

OTHER PUBLICATIONS

Website, https://loadedbikes.co.uk/shop/fork-mount/, "Loaded Bikes Fork Mount," last accessed on Jul. 24, 2023, 6 pages.

*Primary Examiner* — Scott T Mcnurlen
(74) *Attorney, Agent, or Firm* — Vichit Chea; Price Heneveld LLP

(57) ABSTRACT

A rotatable bicycle fork mount including a base configured to mount on a vehicle floor and a vertical extending post extending from the base and a connecting rod coupled to the post and configured to releasably couple to fork arms on a bicycle and a rotatable assembly that allows the mount to rotate relative to the vehicle floor to adjust an angle of the connecting rod.

7 Claims, 5 Drawing Sheets

(56)     References Cited

U.S. PATENT DOCUMENTS

| | | | |
|---|---|---|---|
| 2005/0082324 A1* | 4/2005 | Schlachter | B60R 9/048 |
| | | | 224/924 |
| 2006/0255082 A1* | 11/2006 | Tsai | B60R 11/00 |
| | | | 224/567 |
| 2009/0173762 A1 | 7/2009 | Wang et al. | |
| 2009/0266773 A1 | 10/2009 | Janeczko | |
| 2015/0203051 A1 | 7/2015 | Tofte et al. | |
| 2016/0131166 A1* | 5/2016 | Cox | E05B 71/00 |
| | | | 248/230.5 |
| 2022/0242329 A1 | 8/2022 | Ward et al. | |

* cited by examiner

ROTATABLE BICYCLE FORK MOUNT FOR A VEHICLE

FIELD OF THE DISCLOSURE

The present disclosure generally relates to a bicycle mount and, more particularly, relates to a bicycle mount for use on a vehicle, such as a pickup truck.

BACKGROUND OF THE DISCLOSURE

Motor vehicles are often configured to carry one or more bicycles. In a pickup truck, the bicycle may be stowed in the bed of the truck. However, smaller pickup trucks generally have less space which makes it more difficult to store one or more bicycles. It would be desirable to provide for a bicycle mount for a motor vehicle, such as for a small pickup truck, that may easily accommodate the mounting and stowage of the bicycle.

SUMMARY OF THE DISCLOSURE

According to a first aspect of the present disclosure, a rotatable bicycle fork mount includes a base configured to mount on a vehicle floor, a vertical extending post extending from the base, a connecting rod coupled to the post and configured to releasably couple to fork arms on a bicycle, and a rotatable assembly that allows the mount to rotate relative to the vehicle floor to adjust an angle of the connecting rod.

Embodiments of the first aspect of the present disclosure can include any one or a combination of the following features:

the connecting rod comprises a tube;
    the tube comprises a cylindrical opening that is configured to connect onto the fork arms of the bicycle;
    the tube comprises a fastener removably extendable into the cylindrical opening;
    the fastener comprises a bolt;
    the rotatable assembly comprises one or more slots formed in the base that allow the base to rotate relative to the vehicle floor;
    the rotatable bicycle fork mount comprises one or more floor mount fasteners for fastening the base onto the vehicle floor via one or more slots;
    one or more slots comprises an arcuate-shaped slot;
    the vehicle floor comprises a pickup truck bed; and
    the rotatable bicycle fork mount comprises one or more spacers configured to adapt a length of the connecting rod for connecting to the fork arms on the bicycle.

According to a second aspect of the present disclosure, a vehicle includes a bed comprising a floor, upstanding walls, and a tailgate and a rotatable bicycle fork mount comprising of a base configured to mount on a vehicle floor, a vertical extending post extending from the base, a connecting rod connected to the post and configured to releasably be coupled to the fork arms on a bicycle, and a rotatable assembly that allows the rotatable bicycle fork mount to rotate relative to the vehicle floor to adjust an angle of the connector tube.

Embodiments of the second aspect of the present disclosure can include any one or a combination of the following features:

the connecting rod comprises a tube;
    the tube comprises a cylindrical opening that is configured to connect onto the fork arms of the bicycle;

the vehicle further includes a fastener removably extendable into the cylindrical opening;
    the fastener comprises a bolt;
    the rotatable assembly comprises one or more slots formed in the base that allow the base to rotate relative to the vehicle floor;
    the vehicle further comprises one or more floor mount fasteners for fastening the base onto the vehicle floor via one or more slots;
    one or more slots comprises an arcuate-shaped slot;
    the vehicle comprises a pickup truck having the bed defining the vehicle floor; and
    the vehicle further includes one or more spacers configured to adapt a length of the connecting rod for connecting to the fork arms on the bicycle.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
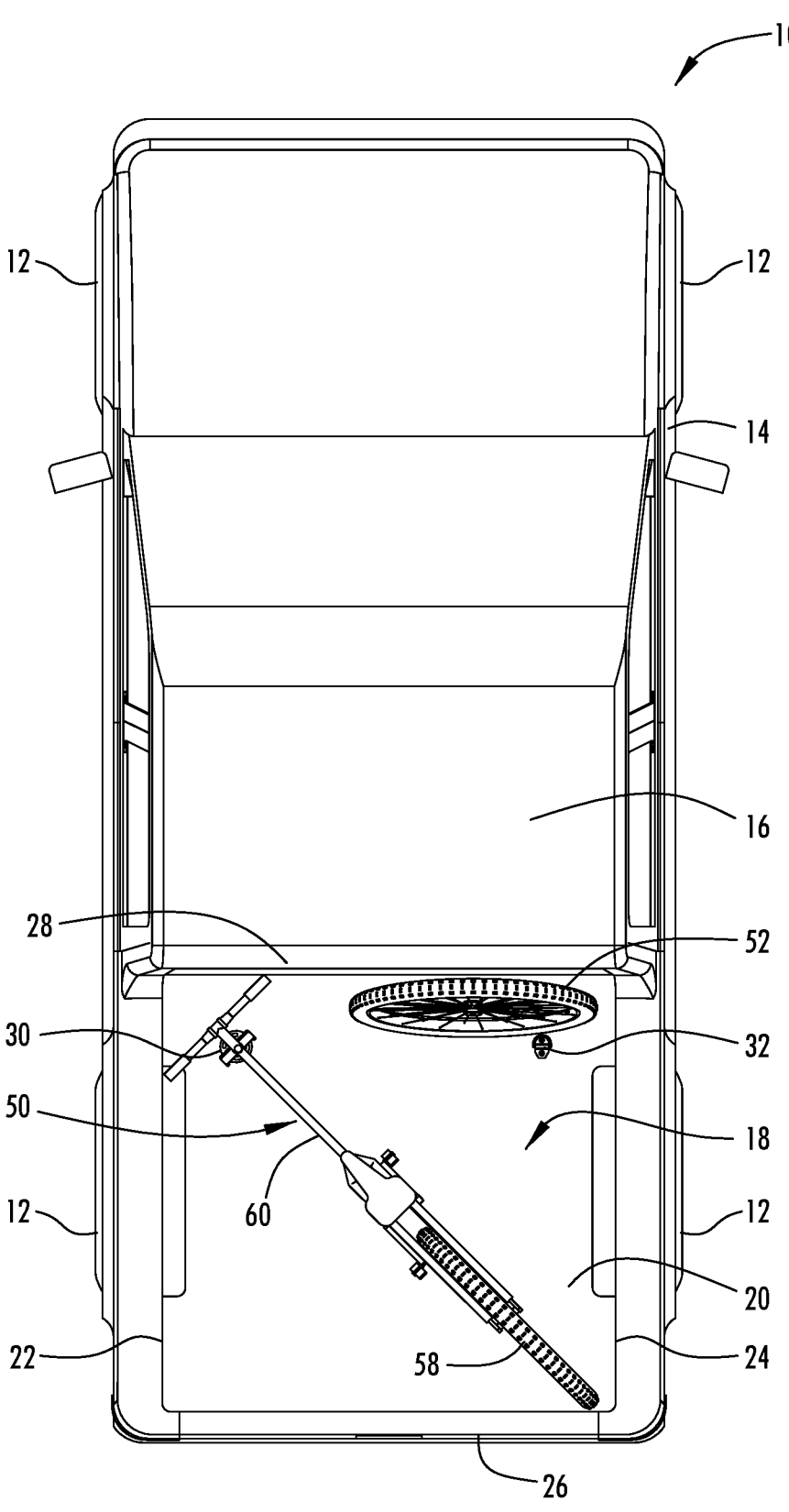
FIG. 1 is a top view of a pickup truck motor vehicle having a bicycle mounted in the bed with a rotatable bicycle fork mount, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illus- trated in the attached drawings, and described in the fol- lowing specification are simply exemplary embodiments of the inventive concepts defined in the appended claims. Hence, specific dimensions and other physical characteris- tics relating to the embodiments disclosed herein are not to be considered as limiting, unless the claims expressly state otherwise.

The present illustrated embodiments reside primarily in combinations of method steps and apparatus components related to a rotatable bicycle fork mount for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a com- position is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that com- prises a list of elements does not include only those elements but may include other elements not expressly listed or inherent to such process, method, article, or apparatus. An element preceded by "comprises . . . a" does not, without more constraints, preclude the existence of additional iden- tical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modi- fied by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figures 2, 2A:
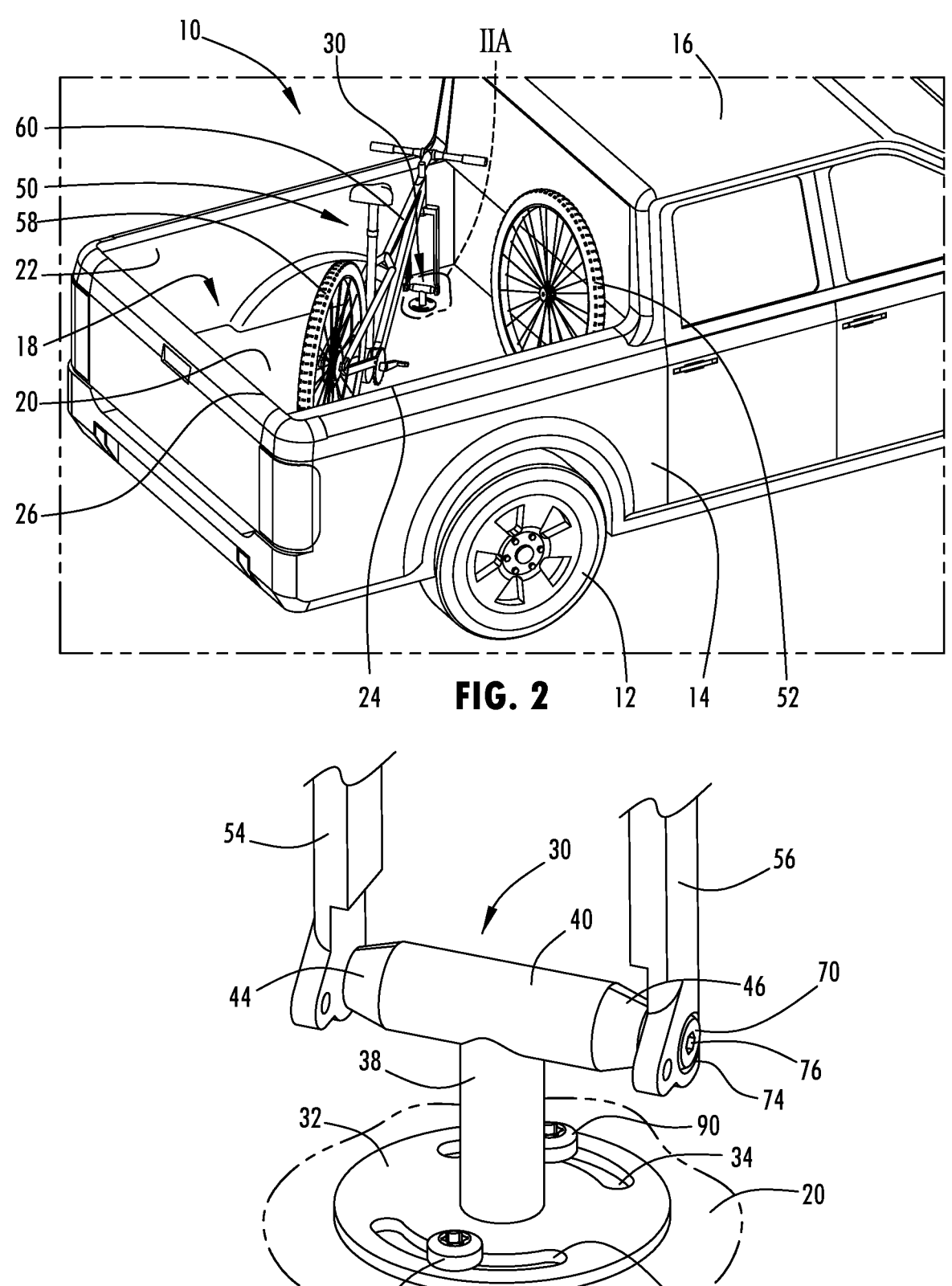
FIG. 2 is a rear perspective view of a rear portion of the pickup truck motor vehicle showing the bicycle mounted in the bed of the truck with the rotatable bicycle fork mount fork mount connected to the bicycle.
FIG. 2A is an enlarged view of section IIA shown in FIG. 2 further illustrating the rotatable bicycle fork mount.

Referring to FIGS. 1 and 2, a wheeled automotive or motor vehicle 10 in the form of a pickup truck is generally illustrated having a plurality of wheel and tire assemblies 12 and a vehicle body 14. The vehicle body 14 includes a cabin 16 in the central region that defines a cabin interior which may include vehicle occupant accommodations and vehicle controls for accommodating a driver of the vehicle and passengers. The motor vehicle 10 shown and described herein is a pickup truck that includes a bed 18 provided at the rear region of the motor vehicle 10. The bed 18 is generally defined by a plurality of upstanding walls which may include left and right sidewalls 22 and 24 and a front wall 28 that is proximate to a rear end of the cabin 16. In addition, the bed 18 may be defined by a tailgate 26 at the rear end of the motor vehicle 10. The tailgate 26 may be locked in a closed upstanding position that defines a rear wall of the bed 18 or pivoted downward to a horizontal open position exposing the rear end of the bed 18. The bed 18 has a floor 20 which is generally flat and may include ribs and other components. The bed 18 may include one or more tie downs 32 which may include a ring for fastening objects in the bed 18 of the motor vehicle 10.

Assembled onto the floor 20 of the bed 18 of the motor vehicle 10 is a rotatable bicycle fork mount 30 which is shown positioned generally in a forward side location of the bed 18 near a corner as seen in FIGS. 1 and 2. However, it should be appreciated that the rotatable bicycle fork mount 30 may be located at other locations within the bed 18. The rotatable bicycle fork mount 30 is configured to removably connect to a bicycle 50 to mount and support the bicycle positioned within the bed 18 of the motor vehicle 10. The rotatable bicycle fork mount 30 can be particularly useful for a smaller bed 18, such as is more commonly found on a smaller pickup truck whereby the rotatable bicycle fork mount 30 may be rotated to better position and support the bicycle 50 within the bed 18. In the example shown, the bicycle 50 is connected at the front forks 54 and 56 to the rotatable bicycle fork mount 30 which may be rotated to a desired rotational position such that the rear end of the bicycle may be stabilized by the bed wall 24 and rear tailgate 26, according to one example.

The rotatable bicycle fork mount 30 is generally config- ured to connect onto the fork arms 54 and 56 on the front end of the frame 60 of the bicycle 50. The fork arms 54 and 56 are configured to connect to a front wheel and tire assembly 52 when the bicycle 50 is fully assembled. Prior to connect- ing the bicycle 50 to the rotatable bicycle fork mount 30, the front wheel and tire assembly 52 of the bicycle 50 is removed from the fork arms 54 and 56, typically by loos- ening and unscrewing a fastener bolt that extends through a center shaft of the wheel and tire assembly 52. The front tire and wheel assembly 52 may be transported separately on the motor vehicle 10. With the front tire and wheel assembly

5 removed, the bicycle is support on the front end by the rotatable bicycle fork mount 30 and on the rear end by a rear tire and wheel assembly 58.

Figure 3:
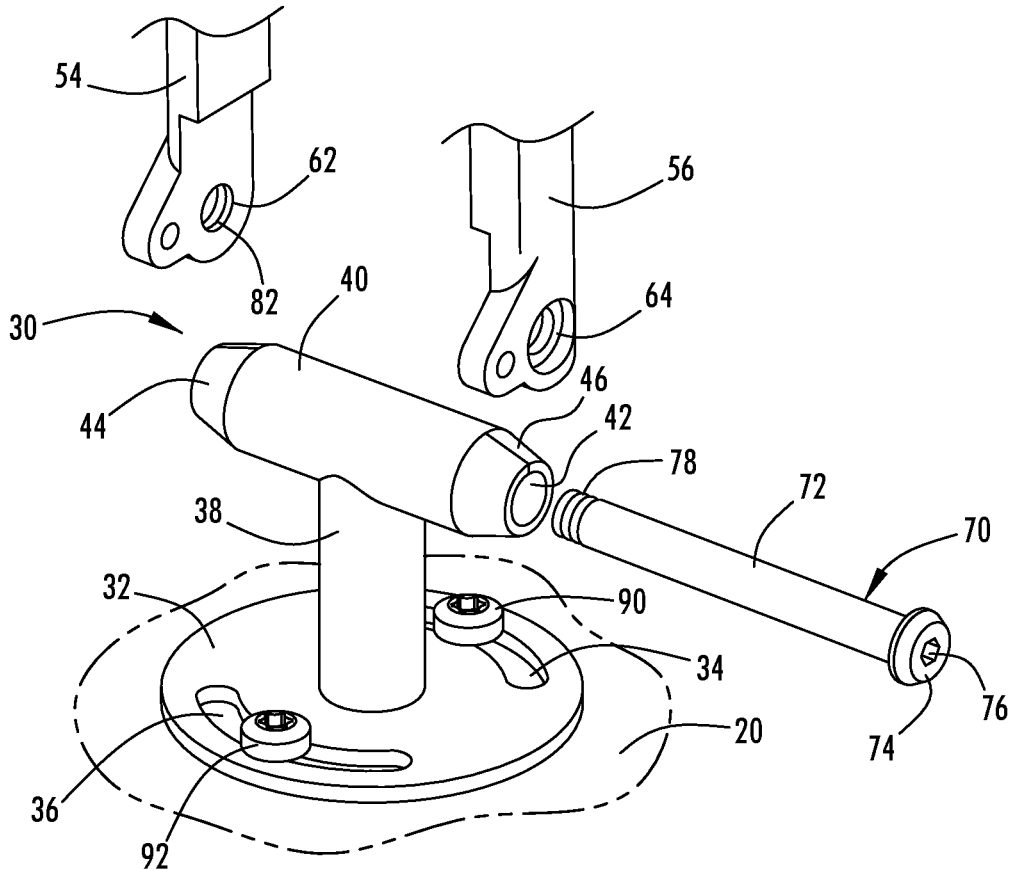
FIG. 3 is a perspective view of the rotatable bicycle fork mount arranged proximate to the fork arms on a bicycle.
Figure 5:
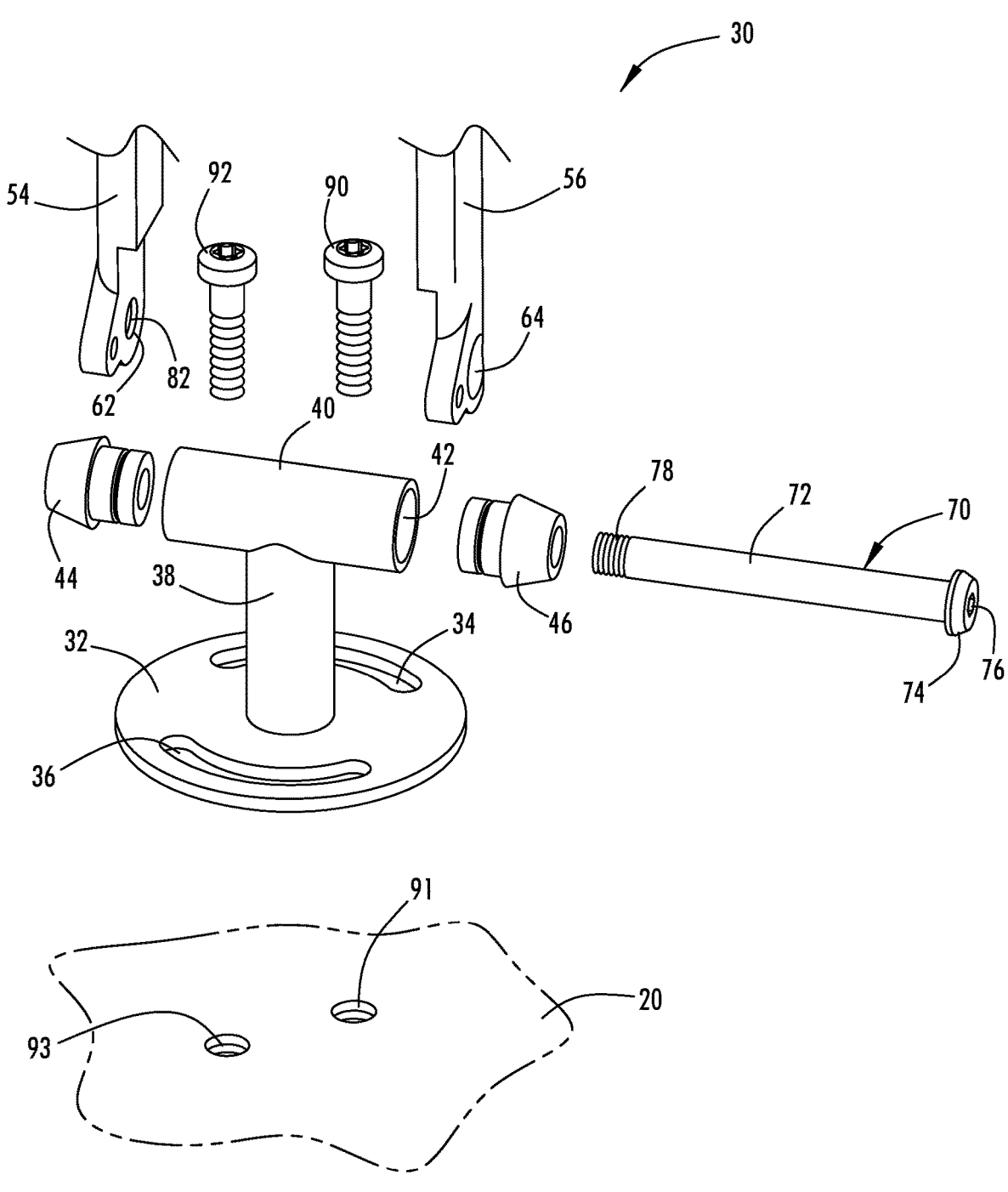
FIG. 5 is an exploded perspective view of the rotatable bicycle fork mount and connecting fork arms of a bicycle.

As seen in FIGS. 2A and 3, the rotatable bicycle fork mount 30 has a base 32 configured to mount onto the top surface of the vehicle floor 20 via mounting holes 91 and 93 shown in FIG. 5. The base 32 has the shape of a flat disc with first and second arcuate slots 34 and 36 located on opposite sides. Each of the first and second arcuate slots 34 and 36 has an arcuate shape extending about ninety degrees (90°) that allows the base 32 to rotate within a rotational angle of approximately zero to ninety degrees (0°-90°), according to one embodiment. The base 32 is fixed in a desired angular orientation via first and second fasteners 90 and 92 that fasten to frictionally engage the base 32 onto the floor 20. The first and second fasteners 90 and 92 may include threaded fasteners such as bolts or screws that may be assembled via threaded openings 91 and 93 onto the vehicle floor 20 and may be loosened or removed to allow rotation of the base 32 to any desired angular position.

The rotatable bicycle fork mount 30 further includes a vertical extending post 38 that extends upward from the top of the base 32 and is generally centered on the base 32. The vertical extending post 38 may be fixedly connected to the base 32 or integrally formed therewith. Coupled to the top end of the vertical extending post 38 is a connecting rod 40 which extends generally horizontal or orthogonal to the vertical extending post 38. The connecting rod 40 and vertical extending post 38 therefore form a T-shape support structure that may rotate with rotation of the base 32 about a vertical axis amongst the available angular positions. The connecting rod 40 may be fixedly connected to the vertical extending post 38 or integrally formed therewith. The base 32, vertical extending post 38 and connecting rod 40 may be made of a rigid material such as a metal, for example, steel or aluminum, that may be formed as a casting or stamped product.

The connecting rod 40 may be a connecting tube, according to one example, which has a hollow cylindrical opening 42 extending through the length thereof. The connecting rod 40 may be sized in length and may be adjusted in length with first and second replaceable end caps 44 and 46 which serves as spacers to match the distance between the forks 54 and 56 on the bicycle 50 to be mounted thereon. That is, if the bicycle 50 has a shorter distance between the forks 54 and 56, the replaceable end caps 44 and 46 may be eliminated or shorter versions of the replaceable end caps 44 and 46 may be utilized. If the distance between the forks 54 and 56 is greater on a larger bicycle having a larger wheel or a wider wheel, such as a fat tire bike, extended length replaceable end caps 44 and 46 may be employed.

To assemble a bicycle onto the rotatable bicycle fork mount 30, the front wheel and tire assembly 52 of the bicycle 50 is removed from the frame 60 of the bicycle 50, and the fork arms 54 and 56 are connected onto opposite ends of the connecting rod 40 on the rotatable bicycle fork mount 30. This may be achieved by aligning the fork arms 54 and 56 onto the connecting rod 40, such that openings 62 and 64 in the respective fork arms 54 and 56 align with the cylindrical opening 42 of the connecting rod 40. With the fork arms 54 and 56 aligned with the connecting rod 40, a threaded fastener such as a bolt 70 may be inserted through the cylindrical openings 42 and openings 62 and 64 in the respective fork arms 54 and 56. The fastener bolt 70 has a shaft 72 and threading 78 at one end that may engage threading 82 formed in opening 62 of fork arm 54 or formed in a nut that may be positioned to engage the outer end of fork arm 54. As such, the threaded bolt 70 extends through the openings 62, 64 and 42, engages the threading 82 which may be tightened in place by rotating the head 74 with a wrench or a lever, for example.

Figure 4A:
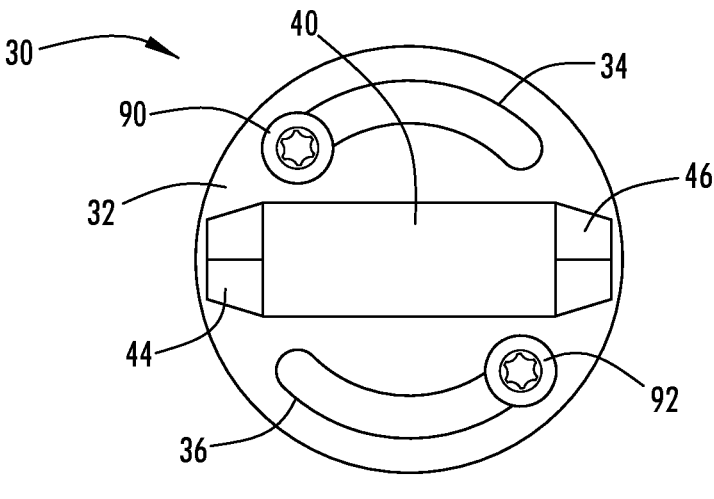
FIG. 4A is a top view of the rotatable bicycle fork mount shown in a first position.
Figure 4B:
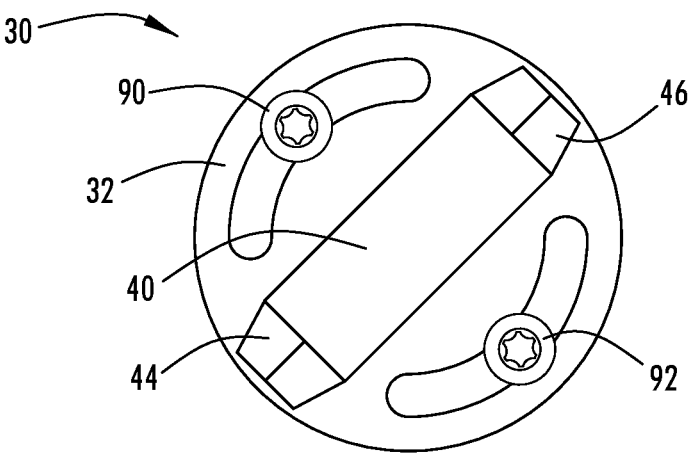
FIG. 4B is a top view of the rotatable bicycle fork mount shown in a rotated second position.
Figure 4C:
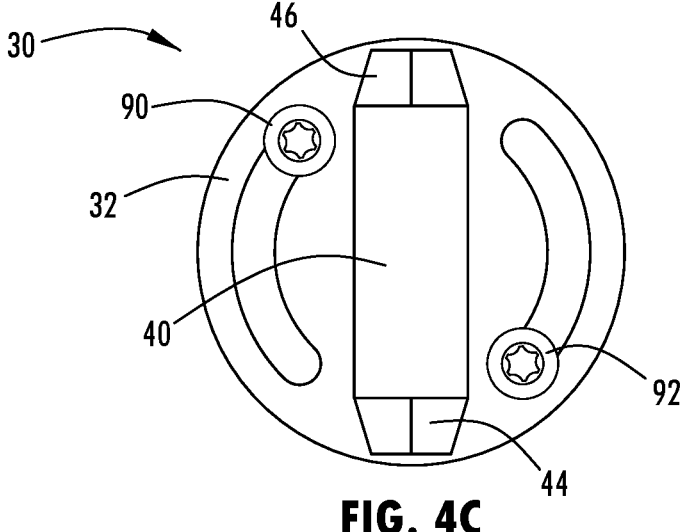
FIG. 4C is a top view of the rotatable bicycle fork mount shown in a further rotated third position.

Referring to FIGS. 4A-4C, the rotatable bicycle fork mount 30 is shown in three different angular positions. As seen in FIG. 4A, the rotatable of bicycle fork mount 30 is oriented in the zero degree position. By loosening the first and second fasteners 90 and 92 and rotating the base 32, the rotatable bicycle fork mount 30 can be rotated to a forty-five degree (45°) position as shown in FIG. 4B. By further rotating the base by ninety degrees (90°) relative to the zero degree (0°) position, the fork mount 30 can be oriented in the ninety-degree (90°) position shown in FIG. 4C. Once the desired angular position is achieved, the first and second fasteners 90 and 92 may be tightened down to fixedly hold the rotatable bicycle fork mount 30 in the desired orientation. It should be appreciated that by rotating the rotatable bicycle fork mount to a desired angular orientation, the effective length of the bicycle 50 within the bed 20 of the motor vehicle 10 may be changed to accommodate different lengths of beds and different size bicycles. For example, in a longer bed or for a longer bicycle, the rotatable bicycle fork mount 30 may be oriented at the zero degrees (0°), whereas for a shorter bed or a shorter bicycle, the rotatable bicycle mount 30 may be rotated at the 90 degrees (90°) to allow the bicycle to fit snuggly within the bed 20 of the motor vehicle 10.

It should be appreciated that the rotatable bicycle mount 30 may be assembled as original equipment on the floor 20 of the bed 18 of the motor vehicle 10. It should further be appreciated that the rotatable bicycle fork mount 30 may be assembled as an aftermarket product onto the floor 20 of the vehicle bed 18. For example, the rotatable bicycle fork mount 30 may be a replacement item that replaces a tie down 32, for example, whereby the tie down may be unscrewed and removed, and the rotatable bicycle fork mount 30 assembled to the same mounting holes.

Accordingly, the rotatable bicycle fork mount 30 advantageously provides for an adjustable bicycle mount that is particularly useful in the bed of a pickup truck. The adjustment of the rotatable bicycle fork mount 30 allows for stable mounting of a bike with an effective length that may be changed due to rotation of the rotatable base.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
a bed comprising a floor having one or more threaded openings, upstanding walls, and a tailgate;
a tie down configurable to mount onto the floor via the one or more threaded openings; and
a rotatable bicycle fork mount comprising:
a base configured to mount on the floor, wherein the base comprises one or more slots each comprising an arcuate-shaped slot;
a vertical extending post extending from the base;
a connecting rod connected to the post and configured to releasably be coupled to the fork arms on a bicycle; and
one or more floor mount fasteners extendable through the one or more slots and into the one or more threaded openings for fastening the base onto the vehicle floor, wherein the one or more floor mount fasteners are configured to be loosened or removed to provide a rotatable assembly with the base being rotatable about a vertical axis with the base and the one or more slots moving relative to the one or more fasteners to adjust an angle of the connecting rod to allow the fork arms on the bicycle to rotate about the vertical axis to change the length of the bicycle, wherein the tie down is removable and replaced with the rotatable bicycle fork mount, and wherein the rotatable bicycle fork mount is removable by removing the one or more fasteners from the one or more threaded openings.

2. The vehicle of claim 1, wherein the connecting rod comprises a tube.

3. The vehicle of claim 2, wherein the tube comprises a cylindrical opening that is configured to connect onto the fork arms of the bicycle.

4. The vehicle of claim 3, further comprising a fastener removably extendable into the cylindrical opening.

5. The vehicle of claim 4, wherein the fastener comprises a bolt.

6. The vehicle of claim 1, wherein the vehicle comprises a pickup truck having the bed defining the floor.

7. The vehicle of claim 1, further comprising a plurality of replaceable end caps coupled to opposite ends of the connecting rod and having selectable lengths configured to adapt a length of the connecting rod for connecting to the fork arms on the bicycle.

\* \* \* \* \*